Jan. 25, 1927.

W. E. JOHNSTON 1,615,456

DEVICE FOR MOUNTING AND CARRYING AUTOMOBILE TIRES

Filed May 13, 1926

Inventor
Walter E. Johnston.
By Adam E. Fisher.
Attorney

Patented Jan. 25, 1927.

1,615,456

UNITED STATES PATENT OFFICE.

WALTER E. JOHNSTON, OF YOUNGSTOWN, OHIO.

DEVICE FOR MOUNTING AND CARRYING AUTOMOBILE TIRES.

Application filed May 13, 1926. Serial No. 108,822.

This invention relates to devices for mounting and carrying automobile tires.

The primary object of the invention is to provide a device which will readily collapse a split steel tire rim to permit mounting a tire on the said rim with ease.

Another object of the invention is to provide adjustable arms which are arranged in such a manner as to remain set upon the steel rim when collapsing the same.

A further object is to provide a tire mounting device which can be used as a carrier, and which is constructed in a relatively simple manner of light and substantial material.

Other objects and advantages of the device will be apparent from the accompanying drawing and specification.

In the drawing

Figure 1:
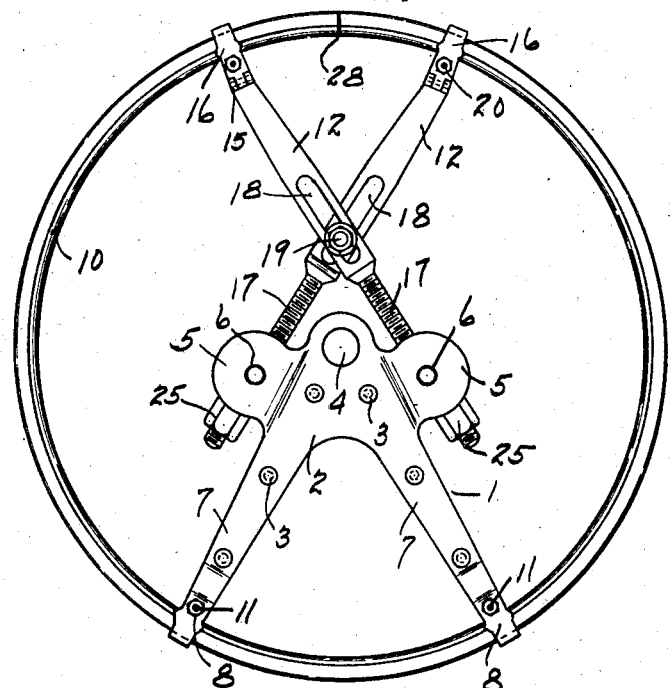
Figure 1 is a front elevation of my tire mounting device as clamped upon a rim for collapsing the same.

In carrying out this invention I provide a sheet metal body 1 preferably made in two sections 2 which are riveted together as shown at 3; the said sections 2 being respectively right and left hand and pierced with an aligned axial hole 4 for mounting the device on the rear of a machine. The said sections are further formed with ears 5 pierced with pivot apertures 6 and arms 7 terminating in spring clamps 8. The said spring clamps 8 which are adapted to straddle the rim 10 are formed with hooks 9 for engaging the periphery of the said rim. Bolts 11 are passed thru the clamps 8 at a point immediately inside of the rim 10 to provide means for locking the said clamps 8 to the rim 10. Adjustable arms 12 which are preferably made of forged steel are formed with offset prongs 13 terminating in hooks 14. Hinge lugs 15 are integrally formed in the said adjustable arms 12 and carry hinged prongs 16 which terminate in hooks 14. The said arms 12 are formed with offset bolt studs 17 for a purpose to be later explained.

Figure 2:
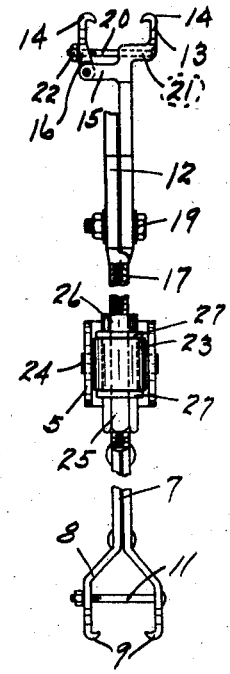
Figure 2 is a side elevation of the device without the rim and having portions thereof broken off.
Figure 3:
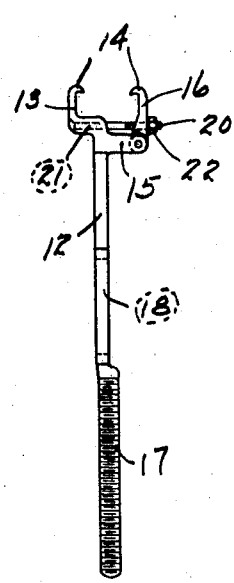
Figure 3 is a detail of one of the adjustable clamps.

Slots 18 are cut in the arms 12 to permit clamping the same together by means of a bolt 19 which serves as a pivot point when assembling the said arms. It will be noted in the assembled arms that the bolt studs 17 are offset oppositely to each other and are thus in perfect alignment with each other. However, the offset prongs 13 are both offset in the same direction; that is, the direction shown in Figure 2 so that both of the hinged prongs 16 are facing outwardly for easy access to the same. Bolt studs 20 are rigidly secured in the offset prongs 13 as shown at 21 and are adapted to pass thru the hinged prongs 16 to permit loosely locking the said prongs to the rim 10 by means of a nut 22. Pivot bearings 23 formed with pivots 24 are mounted between the ears 5; said ears being offset sufficiently to accommodate the bearings 23 and permit the pivots 24 to pass thru the pivot apertures 6. Special nuts 25, preferably made of bronze and formed with sleeves 26 are passed thru the bearings 23; the said sleeves being provided with rigidly secured collars 27 which are located on either side of the said bearings 23. The nuts 25 and sleeves 26 are drilled and tapped to fit the bolt studs 17 of the adjustable arms 12 to facilitate shortening the radii of the rim for collapsing the said rim.

Figures 4, 5, 6:
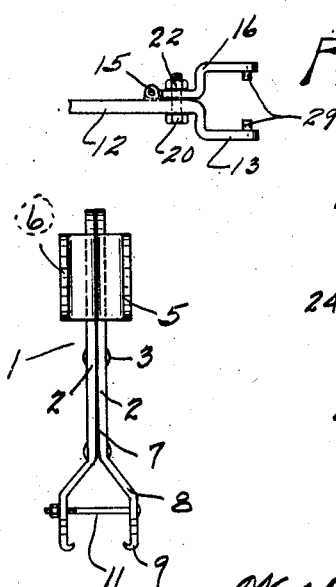
Figure 4 is a detail of the rigid clamps.
Figure 5 is a detail of the swivel bearing of the adjustable clamps.
Figure 6 is a modified view of the adjustable clamps.

In the modified view of Figure 4 the prongs 13 and 16 are provided with studs 29 which are adapted to engage stud notches (not shown) that are cut in the rim 10 on either side of the split portion 28 to permit the adjustable arms to swivel upon the said rim.

In use, the rim 10 is inserted between the spring clamps 8 so that the split portion thereof is opposite to the said clamps and aligned with the center of the body 1 and axial hole 4. The said rim 10 is then rigidly locked between the said clamps 8 by means of the bolts 11 while the opposite portion thereof on either side of the split section 28 is engaged by the prongs 13 and 16, which are locked to the said rim by means of the bolts 20 and nuts 22. In order to collapse the rim, one of the nuts 25 is rotated so as to draw the free end of the rim engaged by the prongs of the particular arm whose bolt stud is engaged by the aforementioned nut, inward, so that the same will pass beneath the opposite end of the rim. By alternately rotating the nuts 25 the rim can be collapsed to the desired size so that the tire will pass freely over the same. In collapsing the rim the arms 12 as a whole, which pivot in the ears 5, pivot upon the free ends of the rim as well as upon the bolt 19 which acts as a pivot for the movements of the said arms 12. To expand the rim after the same has been collapsed the procedure followed in collapsing the said rim is reversed. In using the device as a tire carrier the same is mounted upon a pin or axle (not shown) at the rear of an automobile (not shown) by means of the axial hole 4 of the body 1.

I claim:

1. In a tire carrier and mounting device as described, comprising a body formed with offset ears, disposed oppositely to each other; arms terminating in spring clamps, formed in said body; adjustable arms formed with oppositely disposed offset bolt studs and prongs, the said arms being pierced with elongated slots; means in the said prongs for locking said prongs to a rim; means means passed thru said elongated slots for pivoting said arms to each other; pivot bearings pivoted between said offset ears; nuts formed with sleeves engaging said bolt studs journaled in said pivot bearings; and collars rigidly secured on said sleeves on either side of said pivot bearings.

2. In a tire mounting device as described embodying in combination with a split tire rim a body formed with arms terminating in clamps, and being further formed with offset ears disposed oppositely to each other; adjustable arms formed with prongs slidingly pivoted to each other; bolt studs incorporated in said arms; and means engaging said bolt studs pivotally mounted between said offset ears.

3. In a tire mounting device as described embodying a body formed with arms terminating in spring clamps and offset ears disposed oppositely to each other and pierced with pivot apertures; means incorporated in said body for mounting same as a tire carrier; adjustable arms pierced with elongated slots and formed with bolts, and oppositely disposed bolt studs and offset prongs; hinge lugs embodied in said arms at said offset prongs; prongs hinged in said hinge lugs; means for locking said prongs to the free ends of a split tire rim; a bolt passed thru said elongated slots for pivotally securing said arms; pivot bearings pivoted between said offset ears; nuts formed with sleeves engaging said bolt studs journaled in said pivot bearings; and collars rigidly secured on said sleeves on either side of said pivot bearings.

4. In a tire mounting device as described embodying in combination with a split tire rim, a body formed with arms terminating in clamps, and being further formed with offset ears disposed oppositely to each other; adjustable arms formed with rim engaging means slidably pivoted to each other intermediate their ends and adjustable independently of each other; bolt studs incorporated in said arms; and means engaging said bolt studs pivotally mounted between said offset ears.

In testimony whereof I affix my signature.

WALTER E. JOHNSTON.